Figure 1:
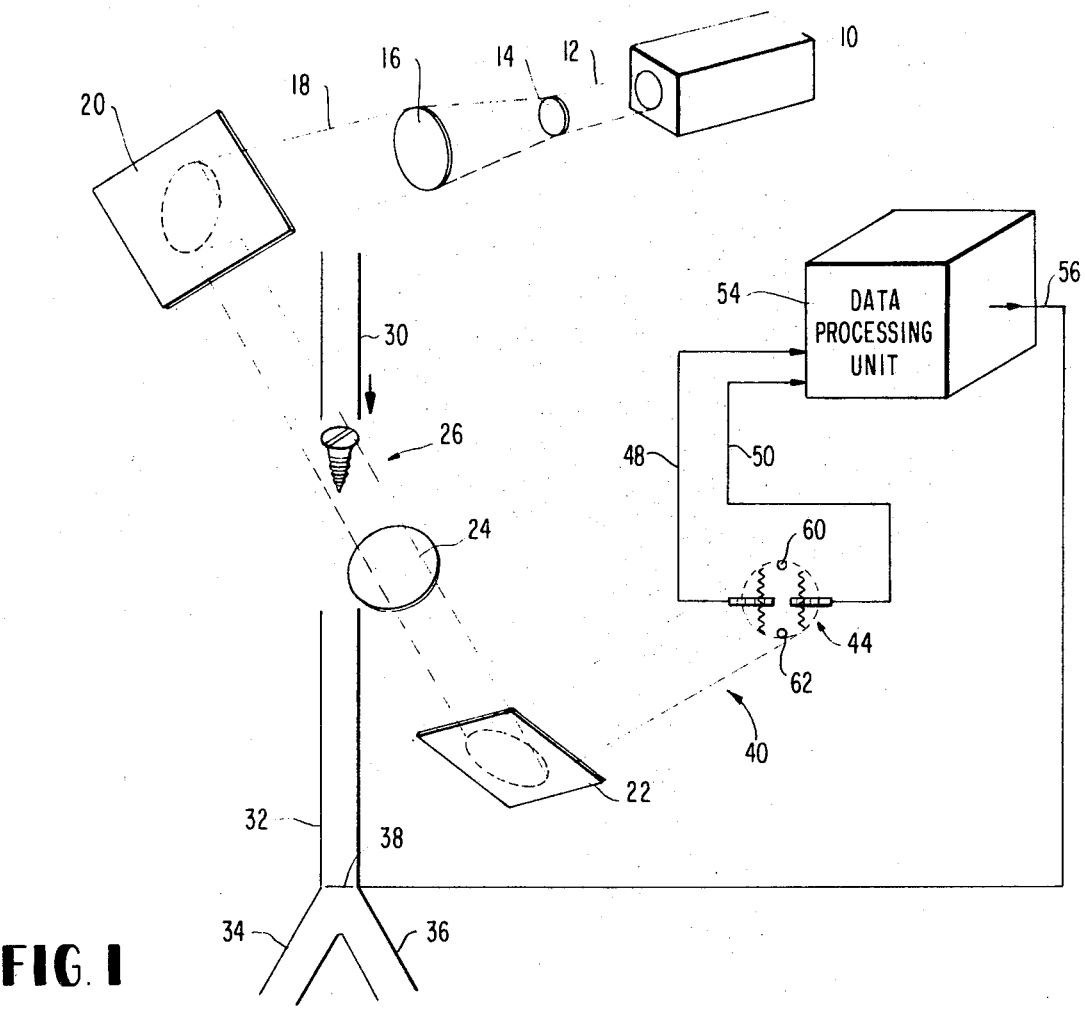

United States Patent

Bornemeier

[15] 3,650,397
[45] Mar. 21, 1972

[54] SYSTEM FOR INSPECTING AND CLASSIFYING OBJECTS SUCH AS SCREWS, BOLTS AND THE LIKE WHILE IN MOTION

[72] Inventor: Dwight D. Bornemeier, Ann Arbor, Mich.
[73] Assignee: Sensors, Inc.
[22] Filed: Nov. 19, 1970
[21] Appl. No.: 90,886

[52] U.S. Cl. ............................. 209/80, 209/82, 209/111.7, 356/165
[51] Int. Cl. ............................................................. B07c 5/00
[58] Field of Search ................. 209/80, 82, 111.7; 365/165, 365/168; 250/223

[56] References Cited

UNITED STATES PATENTS 3,060,791  10/1962  Hornoch ............................. 209/82 X
3,395,794  8/1968  Petry .................................. 209/82 X Primary Examiner—Allen N. Knowles
Assistant Examiner—Gene A. Church
Attorney—Shanley and O'Neil

[57] ABSTRACT

Inspection and grading system for threaded objects comprising sequential detection, measurement, and comparison of major and minor diametral values of a threaded object while in motion. Such values are determined along the pitch angle of the threaded object throughout its longitudinal length. Measurements are made cyclically as the object is guided through the detection zone. The measured values are evaluated e.g., by sequential comparison to computer stored values of a standard threaded object and accepted or rejected based on the selective discrimination level. The objects are counted and classified.

12 Claims, 3 Drawing Figures

Patented March 21, 1972

3,650,397

2 Sheets-Sheet 1

INVENTOR
DWIGHT D. BORNEMEIER

BY Shanley & O'Neil

ATTORNEYS

SYSTEM FOR INSPECTING AND CLASSIFYING OBJECTS SUCH AS SCREWS, BOLTS AND THE LIKE WHILE IN MOTION

This invention is concerned with methods and apparatus for inspecting and grading objects having undulating dimensions such as screws, bolts, studs, and the like, at high speeds and without requiring mechanical contact with such objects. In its more specific aspects the invention is concerned with methods and apparatus for automatic inspection and grading of threaded objects while in motion, for example as part of production line processing.

Many threaded objects, for example those for automotive and electronic control uses, require precision inspection. The highest level inspection provided in the prior art has been limited to manual operation based on comparison viewing. Apparatus for static inspection of threaded objects are shown in U.S. patents to Banfield U.S. Pat. No. 1,421,057 and to Cooke U.S. Pat. No. 1,424,556.

While there has been more recent development of measuring apparatus, e.g., apparatus for measurement of the area of an object as covered in the Hatcher Jr. et al. U.S. Pat. No. 3,515,487, or length and width measurements for purposes of grading of objects as shown in the patent to Rock Jr. U.S. Pat. No. 3,480,141, or measurements for component sizing or selection as shown in the patents to Petry U.S. Pat. No. 3,395,794 and Schnieder U.S. Pat. No. 3,248,845, and various teachings on use of T.V. comparators as shown in the patents to Rosin et al. U.S. Pat. No. 3,178,510 and Reed U.S. Pat. No. 3,218,389, none of these prior developments has discovered or utilized the basic concept of the present invention. Measurement of surface undulations of an object, while the object is in motion, is novel in the art.

The present invention provides for automatic, uniform, inspection of non-stationary objects, and is characterized by an electro-optical system which replaces inspection and decision functions of an operator. A distinct advantage of the invention is that it allows an object to be in motion, within given constraints, during inspection so that production is not halted for inspection. Other advantages include rapid readout and detection of sub-standard parts, provision for predetermined categorization of defects which are cause for rejection, provision for instantaneous records of parts rejected in each category and the total number processed, and provision for setting of discrimination level so that parts failing a given number of tolerance requirements can be accepted, if desired.

Figure 2:
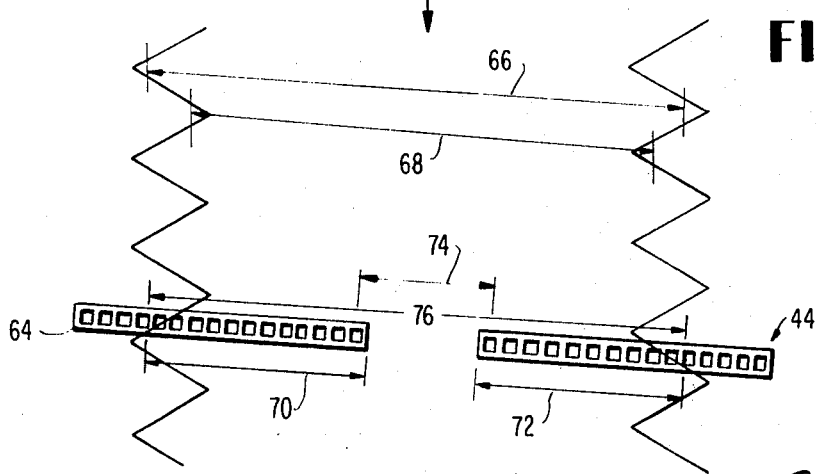
Figure 3:
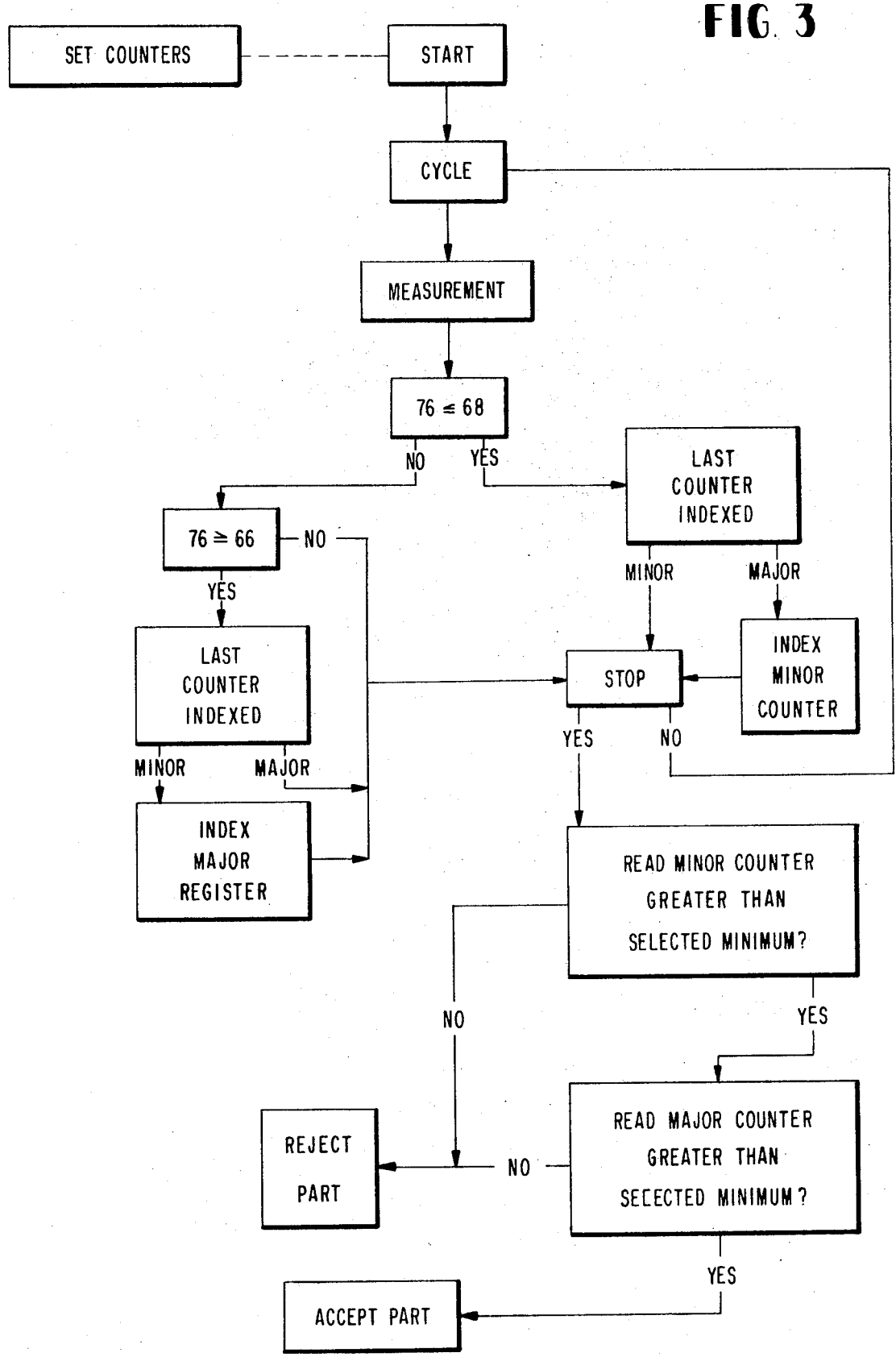

Other objects and advantages of the invention will be considered in presenting a specific embodiment of the invention represented in the accompanying drawings. In such drawings:

FIG. 1 is a schematic perspective presentation of a system embodying the invention, FIG. 2 is a detailed cross sectional view of a portion of a threaded object and a schematic presentation of detector apparatus embodying the invention, FIG. 3 is a box diagram schematic presentation for illustrating functions carried out by the invention.

The invention teaches use of a shadow image of an elevational view of a threaded object. Magnification of the image by a coordinated optical system is utilized to increase resolution and accuracy. The shadow image is projected onto detector means including a preselected arrangement of a series of individual detector elements positioned to provide high resolution and accuracy. The undulating character of objects being inspected, such as threaded objects, is taken into consideration by a significant contribution of the invention in which detector means are cyclically operated to permit measurement of major and minor diameters and other thread characteristics while the object is in motion. Cyclic sequential comparison of measured values and stored values for a standard model can be made for classification purposes or otherwise, e.g., by setting a minimum number of major and minor diameter values to be established before acceptance.

Referring to FIG. 1, a light source 10 projects a beam of light 12 toward beam optic expander structure including lens 14 and 16. The expanded beam 18 is projected from mirror 20 toward mirror 22 as shown. Suitable light energies include optical wave length, electromagnetic radiation including visible light, monochromatic light including infra-red and ultraviolet, and light energy in the quasi-optical field.

In general, for operation of the invention with opaque or semi-opaque objects, where the concern is with configuration faults, the wave energy used should be largely non-penetrative in character. For example, infra-red although considered under some circumstances to be slightly penetrative would be operable while a wave energy such as X-rays would not be suitable for determining accurately the dimensional characteristics of the outline of a threaded object. In brief, suitable wave energy for the present invention should not diminish resolution; the wavelength should not be too short so as to cause undue penetration nor, too long so as to cause fuzzy edging in shadow imaging.

In FIG. 1, the light energy from mirror 20 is directed toward mirror 22 through an image system lens 24. Such light energy path may include an object plane for viewing. Other systems for creating a shadow image of an object under inspection may be used without departing from the scope of the invention.

Part of the invention is control of an object's passage through the object plane. An object can be projected or travel under free falling conditions through the object plane. Velocity and orientation can be controlled in a predetermined manner and are held within practical limits relative to the equipment being used. Guide means 30 guide the object 26 in a direction to permit elevational view inspection during its passage through the object plane; such guide means usually take the form of suitable transparent structure which will not significantly alter the optical requirements.

After passage through the object plane, object 26 is directed to chute 32 having a plurality of outlets, such as 34 and 36, with a selector vane 38 controlling the disposition of the object.

Considering further the image system of FIG. 1, the magnified image of the object 26 while in the object plane is projected from mirror 22 in the form of beam 40 toward detector means 44.

Detector means 44 are electrically coupled over lines 48 and 50 to a data processing unit 54. Line 56 electrically connects data processing unit 54 to the selector vane 38.

As shown in FIG. 1, in addition to a plurality of aligned detectors, the detecting means include a start detector 60 and a stop detector 62. The start detector 60 initiates the sequential cyclic interrogation of the part and stop detector 62 signals passage of the object. Such start and stop detectors are located along the centerline, that is the longitudinal axis of the image; but can be otherwise located as required to provide the necessary initiation and termination of interrogation.

The image projected on the detector means 44 is a magnified shadow outline of the object as shown in FIG. 2. That is, an elevational view, in magnified form, is projected on a plurality of individual detector elements, such as 64, aligned in closely spaced juxtaposition along a line which, in the present instance, is coincident with the pitch angle of the threaded object. This alignment is transverse to the surface undulations of the object so as to permit accurate measurement of the screw thread diameter at any instant.

As shown, the edges of the object determine the boundary of illuminated and non-illuminated areas in the image plane. Dimensional measurement of the shadow image is provided. The photo-responsive detector elements, such as 64, are arranged in array with center-to-center spacing of as low as 0.002 inch. Considering a magnification from the image system of ten a resolution of 0.0002 inch is provided.

The measurement of the major and minor diameters, or intermediate values is accomplished by electrically reading the state of each photo-detector element of which 64 is an example. Such detector elements can be electrically read either sequentially or in parallel and can be wired to respond conductively or non-conductively to irradiation. The object 26 may be moved through the object plane at velocities on the order of meters per second without diminishing the inspection resolution because of the rapidity of interrogation. Operation of the detector elements and interrogation of such elements can be accomplished readily with today's instruments in about 10 microseconds, or less. Therefore, in accordance with he teachings of the invention the speed of the part, as projected or under free fall conditions, can be at the rate of a meter per second, for example, or greater depending on the speed of the electronic interrogation of the detector means selected. With the values of the specific embodiment presented it is seen that such speed of movement for the part would not introduce any measurable error. At increased speeds the interrogation would be required to be faster, however any normal production operation could be handled within the readily available values set forth above.

The relative motion between the detectors and the part is taken care of by the cyclic reading. Also, it is to be noted that this relative motion plays an important part in the invention in permitting the entire part to be scanned, by repeated measurements across the part, each 10 to 20 microsecond cycle time or less. Therefore each thread can be inspected not only for major and minor diameters but sufficiently frequently to establish slope.

With objects having spaced series of threads or requiring nonuniform threads, cycling time can be adjusted to the particular sequence, if required. But, in general, comparing the values read to standard values in a data processing unit will take care of any practical production situation.

Data processing in the case of screw threads can be accomplished by comparing the measurement obtained each cycle with standard values for the thread which are stored in the electronic memory unit of the data processor. Detection of a predetermined number of major and minor diameter values can be relied on solely for grading. The axis of the bolt or screw to be inspected is aligned in proper relationship to the detector units so that diametral values can be readily and accuragely determined; ordinarily about 5° angled relationship between the longitudinal axis of the object and the centerline between the detector can be tolerated without significant effect on accuracy because of the insignificant linear change, at such small angles, compared to detector resolution.

In the specific example of FIG. 2, linear value 66 is selected to represent a major diameter value which is slightly less than the desired major diameter for the threaded object. In other words, value 66 takes into consideration a tolerance limit for the major diameter.

In the same embodiment, linear value 68 represents a minor diameter value which is slightly greater than the desired minor diameter, i.e., within the allowed tolerance.

These diametral values are entered in the data processing unit. A typical quality control requirement would be that the threaded object have a certain minimum number of major and minor diameter measurements, within the above tolerance limits, along its length. During inspection each measurement of a major and minor diameter within the values 66 and 68 is counted. The data processor will keep a record of the count of the major and minor diameters measured and direct the grading of the object either during inspection or after full inspection. A lesser number of major or minor diameter values than designated would cause rejection.

With higher quality control requirements the sequence of measurements can be compared with stored information in the processing unit. It is clear that storing of profile information is, for practical purposes, unlimited so that numerous sequential tests can be performed including tests not limited to periodic or symmetrical profile outlines. The number of profiles which can be stored in a single unit are in the thousands, and increasing with improved memory storage units, so that for practical manufacturing purposes there is no limit placed on the operation by the data processing unit. The most complex requirements including thread slope, tapered threads or shanks, apertured shanks, minimum head dimensions, and the like, can be handled.

In making a measurement of a major and minor diameter the photo detector arrays can be read in a number of ways. After start of the cyclic interrogation of the detector arrays by start detector 60, measurements can be made at cyclic intervals corresponding to the major and minor diameters positioning of the threaded object. In a more simplified arrangement, diametral measurements are made continuously and major and minor diameters sensed by detected values above and below the present tolerance levels.

Positioning of the detector unit is accurately known, as is the intermediate spacing between the detector units. Hence the measured linear values 70 and 72 are readily determined electronically and the centerline value 74 is accurately known. A summation value 76 of centerline value 74 and the measured linear values 70 and 72 provides a measurement near the major diameter in the example as shown in FIG. 2.

Similar measurements continue throughout the length of the part. Faults are recorded in the data processing unit and faults beyond a predetermined discriminator level determine whether the part should be ejected or maintained. The signal from the data processing unit positions the selector vane 38 and controls disposition of the threaded object.

Measurements can be made obtaining differing elevational views of the object from varying angled relationships by making measurements from a plurality of stations. Also the object being inspected can be rotated during viewing. From a practical viewpoint such added viewing is not required on threaded objects produced by standard manufacturing processes in use today since a thread fault will rarely be limited to a single profile with such manufacturing processes.

In a typical sequential measurement arrangement of a threaded object, the data processing unit will include at least two counters, one for major diameters and one for minor diameters. The minimum number of measurable major diameters and minor diameters for an acceptable part will be set in the data processing unit. Such values can be indicated by the data processing unit along with measured values as made.

During inspection, each measurement made in the manner indicated by FIG. 2 is compared with the major diameter value 66 (with tolerance) and the minor diameter value 68 (with tolerance). The first time a major diameter is measured the counter for the major diameter is indexed. The first time a measurement of the minor diameter occurs, the counter for the minor diameter is indexed. These counters can be set up as shown in the data processing flow chart of FIG. 3 so as to be indexed only if alternate major ad minor diameter measurements occur. That is, the major diameter counter will be indexed again only if the minor diameter counter is indexed intermediately. After the part has passed through the inspection area it no longer produces an image on the detectors. Then the number of counts in each counter is compared with the selected value for the major and minor diameter values. If the number of major and minor diameters counted exceed the minimum required for each, then the part can be accepted. Variations in this data processing scheme can be made by comparing a sequence of measurements sequentially with stored information in the data processing unit.

As shown in the flow chart for the data processing unit, FIG. 3, cycling is started by an object passing start detector 60. Measurement of the value 76, that is, the summation of centerline value 74 and the measured values of each bank 70 and 72 are made. This measurement value is interrogated to determine whether the summation value 76 is greater than or equal to the minor diameter value. When the summation value 76 is greater than the minor diameter value 68, the measurement is interrogated to determine whether it is equal to or greater than the major diameter value 66. If the answer to this latter interrogation is no, another measurement is called for. Measurements and interrogations continue; when the summation value 76 is equal to or greater than the major diameter value 66 then, the counter for the major diameter is indexed, that is increased by one. The cycle is repeated with the minor diameter counter being indexed when the summation value 76 readings indicate a measurement of a minor diameter.

After final inspection the minor diameter counter is read to determine whether the minor diameters counted were greater than the selected minimum. If not, the part is rejected. Similarly, the major diameter counter is read and if the value there is not greater there than the selected minimum the part is rejected. Otherwise, if both values, i.e., major and minor diameter counter values, exceed the minimum selected the part is accepted.

Other data processing and indexing approaches are readily available to those skilled in the art and the flow chart shown in FIG. 3 is representative only of a simplified measuring system in which continuous measurements are taken. With a standardized item, traveling at a standardized speed and orientation, the cyclic measurements could be timed to the major and minor diameter locations after initial start up and, the part could be accepted immediately after the minimum number of major and minor diameters for an acceptable part are reached.

In addition, other imaging systems can be utilized without departing from the spirit of the invention so that in determining the scope of the invention reference should be had to the appended claims.

What is claimed is:

1. An electro-optical system for in-line inspection of of opaque and semi-opaque light attenuating objects having an undulating surface such as bolts, screws, studs, and the like, while traveling in an axial direction transverse to a sectional view of such undulating surface comprising
    source means for radiant energy which is substantially non-penetrative in character,
    optic means for establishing an image system with an object plane for elevational viewing of such objects while traveling through the object plane,
    guide means for directing such objects along a predetermined path into the object plane and providing a predetermined orientation for such objects,
    detector means positioned to receive a projection of an object being inspected during passage through the object plane, the detector means including a plurality of individual detector elements arranged in side-by-side predetermined spaced relationship to detect dimensional characteristics from a shadow image of the object cast on the detector elements during passage of the object through the object plane,
    means for cyclically interrogating the individual detector elements to sequentially measure dimensional characteristics of the undulating surface during such passage, and
    data processing means responsive to such cyclic interrogation for generating a signal to control disposition of the object.

2. The system of claim 1 in which the data processing means include storage means for storing dimensional values of a standard model of the object under inspection and including means for comparing the sequentially measured dimensional values for such object with the stored dimensional values for a standard model of the object to determine classification of the inspected object.

3. The system of claim 1 in which the detector means are in uniformly spaced relation.

4. The system of claim 1 in which the optic means magnify the image of the object during inspection and as cast on the detector means.

5. The system of claim 1 for inspecting an elongated threaded object in which the plurality of detector elements are arranged in side-by-side relation along a line which coincident with the pitch angle of the threaded object and transverse to its longitudinal axis.

6. The system of claim 5 in which spacing between center points of the detector elements along a line coincident with the pitch angle is about 0.002 inch to about 0.02 inch.

7. The system of claim 1 in which the detector elements comprise photo-responsive semi-conductor cells electrically coupled to produce an input signal for the data processing means.

8. The system of claim 1 in which the data processing means includes a counter means for ascertaining and recording the number of threaded objects inspected.

9. The system of claim 1 further including ejector means connected to be activated by the computer means to eject parts having a predetermined number of faults.

10. The system of claim 1 in which the guide means defines a tubular configuration for the object to be inspected and comprises material which is substantially transparent and non-attenuating to the radiant energy.

11. A method for electro-optically inspecting light attenuating objects having an undulating surface, such as bolts, screws, studs, and the like, comprising
    establishing an object viewing plane for projecting a magnified image of an object to be inspected,
    guiding an object to be inspected along a predetermined path and with predetermined orientation through the object plane so as to have its undulating surface cast a shadow image on a plurality of detectors aligned in predetermined spaced relationship along a line transverse to such undulating surface shadow image,
    cyclically interrogating the detector means to sequentially measure diametral characteristics of the undulating surface and generating responsive signals,
    directing signals form the detector means to a data processing means, and
    controlling classification of the object being inspected responsively to such sequentially measured diametral characteristic.

12. The method of claim 11 including the step of comparing diametral characteristics of the undulating surface as detected by the detector means to standard values for such surfaces stored in the data processing means.

* * * * *